(No Model.)
C. F. SCHMIDT.
ROLLER PRESS.
No. 325,447. Patented Sept. 1, 1885.
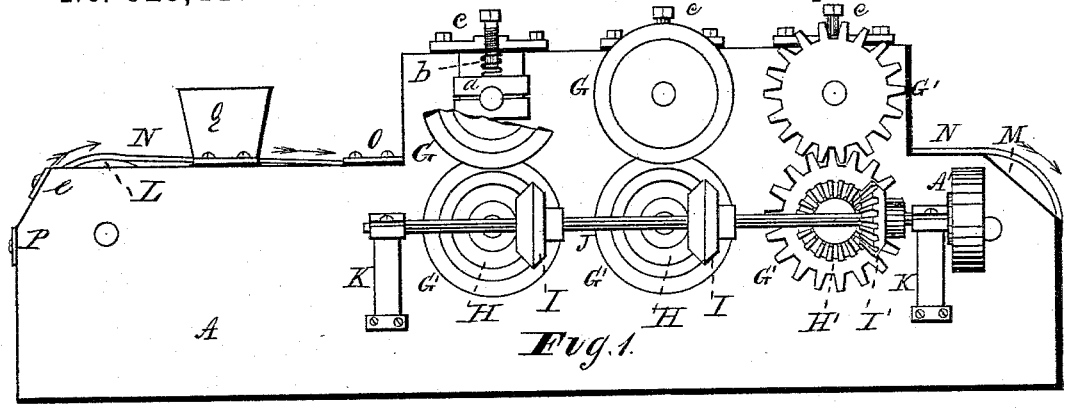
Fig. 1.
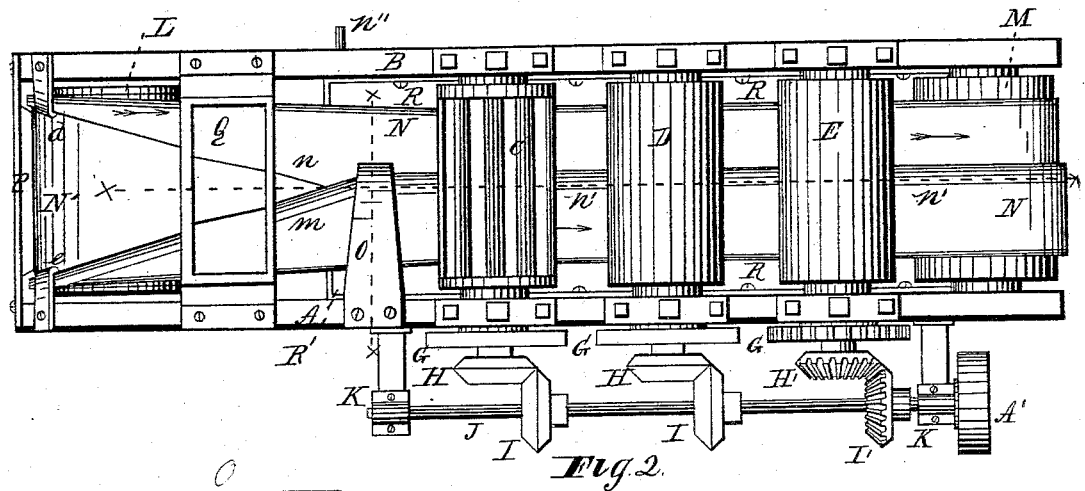
Fig. 2.
Fig. 4.
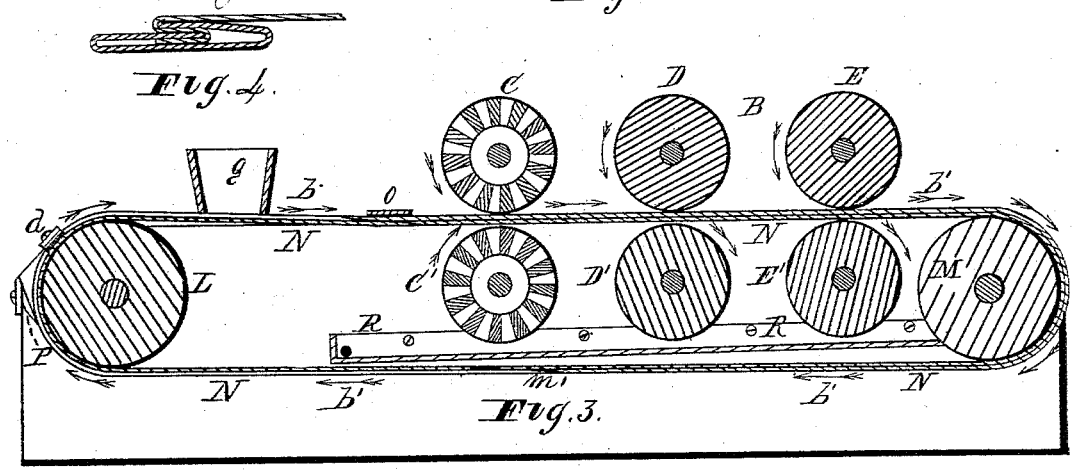
Fig. 3.
Witnesses.
J. H. Burridge
L. T. Morley
Inventor
C. F. Schmidt
W. H. Burridge
Att'y

UNITED STATES PATENT OFFICE.

CHARLES F. SCHMIDT, OF CLEVELAND, OHIO.

ROLLER-PRESS.

SPECIFICATION forming part of Letters Patent No. 325,447, dated September 1, 1885.

Application filed April 15, 1885. (No model.)

*To all whom it may concern:*

Be it known that I, CHARLES F. SCHMIDT, of Cleveland, Cuyahoga county, State of Ohio, have invented a certain new and Improved Roller-Press; and I do hereby declare that the following is a full and complete description of the same.

The press above mentioned consists of a frame having therein a horizontal arrangement of a series of rollers, three in number, but which may be more in number, if so desired. Immediately below said rollers is a corresponding series of rollers in close proximity to those above. At each end of the frame is a guide-roller, around which from one to the other revolves an endless apron. The upper part of the apron passes between the upper and lower series of rollers, whereas the lower part of the apron passes under the lower rollers. Each upper roller is geared to the one below, and is operated by a shafting of miter-gearing adapted to drive the lower rollers, which in turn operate the upper ones.

A full detailed description of the construction of the press and the operation of the same is in the following specification, and illustrated in the accompanying drawings, making a part thereof, in which—

Figure 1 represents a side elevation of the press. Fig. 2 is a plan view; Fig. 3, a vertical section longitudinally through the line $x\ x$ of Fig. 2. Fig. 4 is a detached vertical section through the line $x'\ x'$ in Fig. 2.

Like letters of reference denote like parts in the drawings.

In the sides A and B of a suitably-constructed frame is journaled a series of rollers, C, D, and E. The upper part, $a$, of the journal-box of each upper roller is vertically movable, but which is held down upon the journal by a spring, $b$, inclosing the end of the set-screw $c$, substantially as seen in Fig. 1, in which a portion of one of the cog-wheels G is represented as broken away, that the journal-box, screw, and spring may be seen. The office of said screw is to regulate the height that the upper rollers may rise, which may be more or less, as the material being pressed may require. All the journals of the upper rollers are provided alike with a movable box, screw, and spring. On the shaft of each of the upper rollers is a cog-wheel, G, one being a duplicate of the other.

Immediately below the rollers C, D, and E are corresponding rollers, C', D', and E', journaled in the frame in fixed boxes, and having on their shafts cog-wheels, respectively G' G' G', duplicates of the cog-wheels G, with which they engage, as seen in Fig. 1. Two of the cog-wheels only are shown in full; also, on each shaft of the lower rollers is a pinion, H, made to engage corresponding pinions, I, on the shaft J, journaled in the arms or brackets K K, projecting from the sides of the frame, as seen in the drawings. Pinions H' and I' only are shown in full.

In each end of the frame is journaled a roller, respectively L and M, around which from one to the other runs an endless apron, N, the upper part of which passes between the two series of rollers, and the lower part thereof passes along under the lower rollers, as seen in Fig. 3 of the drawings.

O is a folder secured to the top of one side of the frame, and projects therefrom inward over the endless apron to about the middle thereof, as seen in Fig. 2, the purpose of which will presently appear.

P is a scraper attached to the end of the frame, and so adjusted that the edge thereof will touch the face of the endless apron, as shown in Fig. 3.

On the top of the frame is a hopper, Q, to which further attention will presently be called. $d$ and $e$ are a pair of hooks attached to the end of the frame, and so arranged in relation to the endless apron that the edges thereof are caught by the hooks and pass, respectively, along through them as the apron revolves.

The special use of the above-described press is for extracting paraffine from paraffinized oil, which for that purpose is chilled to a solid mass by any suitable refrigerator.

By a belt applied to the drum A' the gearing above described is so operated as to cause the rollers to revolve in the direction of the arrows, thereby carrying the apron in the direction of the arrows $b'$. It will be noticed that nearly the full width of the apron is shown at N' in Fig. 2, where it passes up over the roller L, at which point the edges of the apron are caught by the hooks and the apron spread out transversely—that is to say, between the hooks and near them on either side, as seen at N'. The edges of the apron as they leave the hooks are lapped over onto the plane of the apron and the laps converge to the folder O, by which the side $m$ of the apron is folded over onto the side $n$ thereof, as indicated by the dotted line $n'$. This longitudinal fold or lap of one edge of the apron onto the other is continued until the folded edges come to about the point $m'$, Fig. 3. The fold then begins to separate by the transverse pulling on the apron by the hooks $d$ and $e$, and which is spread out between them and in their vicinity, as seen at N', from which the folding begins again and the lapping completed by the folder O, the construction and the operation of which are substantially the same as the folder of a sewing-machine. A detached sectional view of the folder and apron therein is shown in Fig. 4.

From the above it will be seen that the folding of the edge of the apron commences at or near the hooks and is completed by the folder, and that the fold continues until it passes around the roller M and approaches the roller L. The fold then begins to separate by means of the hooks, and which is wholly separated by them and the apron spread flat out between them, to be again folded by the folder, as before described, and so on alternately the apron is folded and opened during the operation of the press.

Having described the folding and unfolding of the apron, the practical use of which for pressing the above-mentioned chilled oil is as follows: The chilled oil is thrown into the hopper Q, through the opening in the bottom of which it falls onto the face of the apron in front of the folder, which is then covered by the edges of the apron turned over onto it by the folder. The material thus covered by the sides of the apron passes between the rollers, and by their co-operative pressure upon the apron and its contents the oil is pressed out therefrom, which flows down into a catch-pan, R, interposed between the lower rollers and the apron below them, and is thereby conducted to the outlet $n''$, by which it is discharged into a vessel adapted to receive it. (Not shown in the drawings.) The paraffine remains adhering to the surface of the apron until it reaches the scraper P, by which it is removed from the apron before reaching the spreading-hooks, so that the wide surface of the apron is free of paraffine and in condition to receive more chilled oil from the hopper as it passes under it, and which is again folded under the edges of the apron and submitted to the compressive action of the rollers, as above described.

The teeth of the cog-wheels are made of considerable length, so that the upper wheels when moved upward will still engage the lower ones.

What I claim as my invention, and desire to secure by Letters Patent, is—

In a press for extracting paraffine from oils, an endless fabric apron or belt adapted to run over guiding-rollers and between two series of pressing-rollers, arranged, respectively, above and below the apron, said rollers being journaled in a suitable frame, of which A and B are the sides, and the upper series of pressing-rollers having their journals in yielding boxes, cog-wheels and pinions for operating the pressing-rollers, folding attachment, hooks $d$ and $e$, and scraper, constructed and arranged substantially as described, and for the purpose herein set forth.

In testimony whereof I affix my signature in presence of two witnesses.

CHARLES F. SCHMIDT.

Witnesses:
D. MEYNE,
J. H. BURRIDGE.